United States Patent [19]
Nering et al.

[11] Patent Number: 5,784,238
[45] Date of Patent: Jul. 21, 1998

[54] COORDINATED CLUSTER TOOL ENERGY DELIVERY SYSTEM

[75] Inventors: Eric A. Nering, Modesto; Dan R. Fleming, Sunnyvale, both of Calif.

[73] Assignee: Applied Materials, Inc., Santa Clara, Calif.

[21] Appl. No.: 690,925

[22] Filed: Aug. 1, 1996

[51] Int. Cl.⁶ .................................................. H02H 3/00
[52] U.S. Cl. .................................................. 361/65; 361/62
[58] Field of Search .................................. 361/54, 58, 62, 361/65, 56, 93; 307/46, 62, 64, 66, 86, 155, 34, 29, 35, 38, 41, 42

[56] References Cited

U.S. PATENT DOCUMENTS

| | | | |
|---|---|---|---|
| 3,359,426 | 12/1967 | Burr | 307/38 |
| 4,031,406 | 6/1977 | Leyde et al. | 307/41 |
| 5,073,848 | 12/1991 | Steigerwald et al. | 307/82 |
| 5,297,015 | 3/1994 | Miyazaki et al. | 307/151 |

Primary Examiner—Ronald W. Leja
Attorney, Agent, or Firm—Michael A. Glenn

[57] ABSTRACT

A coordinated cluster-tool energy distribution system provides a systems level approach to supplying all process energy needs for such industrial applications as those found in the semiconductor manufacturing industry, e.g. a single-wafer or multiple chamber processing chamber. The system is preferably provided as an integrated whole, rather than as a piece-meal collection of various energy distribution elements. The system comprises a shared DC bus that provides load diversity at lower energy levels, eliminates power supply components and/or minimizes the operating capacity of such components, and provides a lower installed cost; a common rectifier/filter or switcher power supply front end that lowers overall system cost, eliminates redundant power supply components, and provides a smaller system form factor; and (optionally) an energy storage device, such as a battery, capacitor, or flywheel, that reduces peak demand, thereby allowing smaller feeder circuits and a smaller energy source, and further providing ride through protection against brown-outs.

44 Claims, 3 Drawing Sheets

COORDINATED CLUSTER TOOL ENERGY DELIVERY SYSTEM

BACKGROUND OF THE INVENTION

1. Technical Field

The invention relates to the delivery of electrical energy to industrial equipment. More particularly, the invention relates to a coordinated cluster tool energy delivery system.

2. Description of the Prior Art

FIG. 1 is a block schematic diagram that represents the present practice employed in the semiconductor manufacturing industry to supply electrical energy to power drivers 12–15 that are associated with the various individual process chambers 16–19 that comprise a cluster-tool. Electrical energy is also supplied to mainframe systems 20. In the system shown on FIG. 1, the distribution of electrical energy is handled at the AC main's level.

In FIG. 1, a source of such electrical energy 10 is shown providing 208 VAC through a circuit breaker 31 to several circuits located along an electrical energy distribution bus 32. It should be appreciated that the source could provide other voltages, such as 480 VAC, depending upon the standard voltage that is available at the factory.

To distribute such electrical energy to the various pieces of equipment in a factory, it is necessary to size each circuit (e.g. circuits 21–25) to provide a current carrying capacity that is sufficient for the individual worst case peak load of all of the equipment that is connected to the circuit. The size of the circuit breakers 26–30 associated with each circuit, as well as such circuit elements as the wire and the conduit, is dictated by various electric codes, as well as by local practice. In the example shown on FIG. 1, each piece of process equipment has a 400 A circuit breaker 26–29, while the mainframe systems 20 each have a 200 A circuit breaker 30. Thus, the 208 VAC bus 32 is protected by a 1200 A circuit breaker 31 and the source of electrical energy 10 is rated at 1200 A.

If the entire system is viewed as supplying a single machine, then the electrical energy delivery system must be sufficiently large to handle all of the accumulated worst case energy needs for each individual piece of equipment. This is necessary if the system is to meet the requirements of the various electrical codes, and thereby provide acceptable safety factors. Unfortunately, such arrangement does not allow for load leveling or diversity. Thus, the electrical energy delivery system must have sufficient capacity to meet a total worst case load even though it is extremely unlikely that all pieces of equipment will simultaneously require a worst case level of electrical energy, and even though it is unlikely that all of the equipment will be operated at the same time. It would therefore be advantageous to provide a mechanism that supplies adequate electrical energy to operate several pieces of equipment, but that does not require excess capacity that is otherwise unused during most phases of normal equipment operation.

SUMMARY OF THE INVENTION

The invention provides a coordinated cluster-tool energy distribution system that comprises a systems level approach to supplying all process energy needs for such industrial applications as those found in the semiconductor manufacturing industry, e.g. a single-wafer process chamber. The system is preferably provided as an integrated whole, rather than as a piece-meal collection of various energy distribution elements. The system comprises a shared DC bus and a common rectifier/filter front end. In an alternative embodiment, the system further comprises an energy storage device, such as a battery, capacitor, or flywheel.

The DC bus provides load diversity at lower energy levels, eliminates power supply components and/or minimizes the operating capacity of such components, and provides a lower installed cost. The energy storage device reduces peak demand, thereby allowing smaller feeder circuits and a smaller energy source. Thus, the system provides load leveling and ride through protection against brownouts. The common rectifier front end lowers overall system cost, eliminates redundant power supply components, and provides a smaller system form factor. The system is more reliable, having fewer components at lower ratings, while generating less heat. Therefore, the system is also more energy efficient.

DETAILED DESCRIPTION OF THE INVENTION

Figure 1:
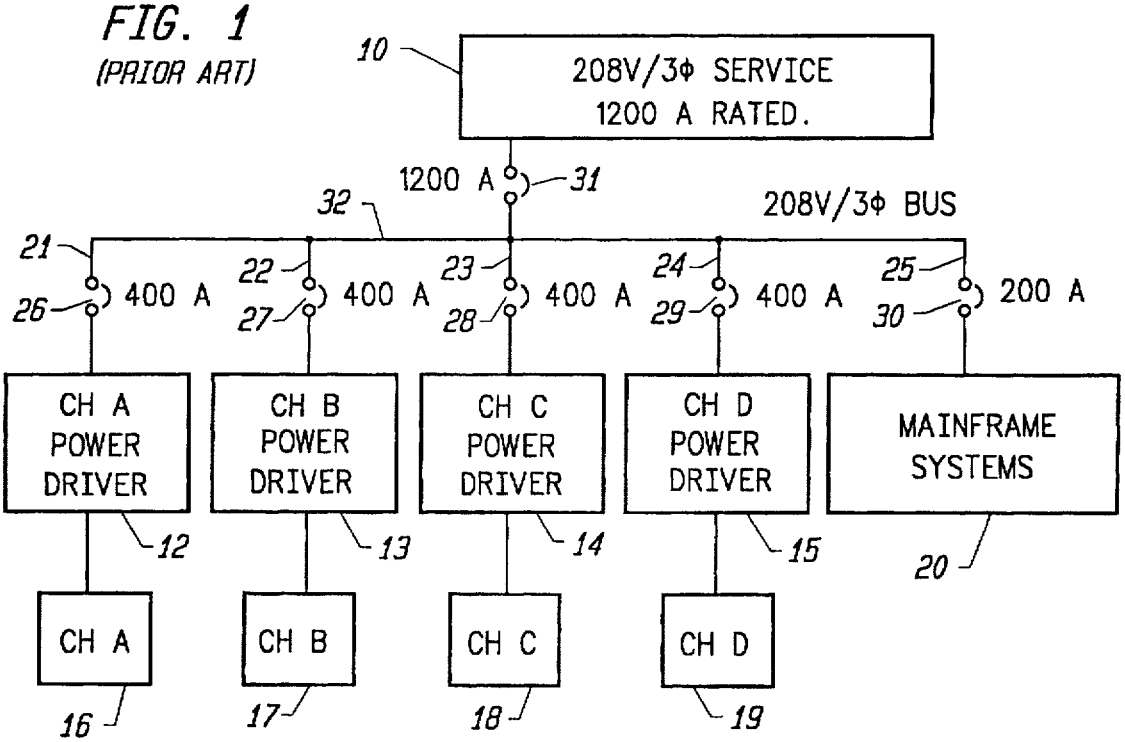
FIG. 1 is a block schematic diagram of a prior art energy distribution system.
Figure 2:
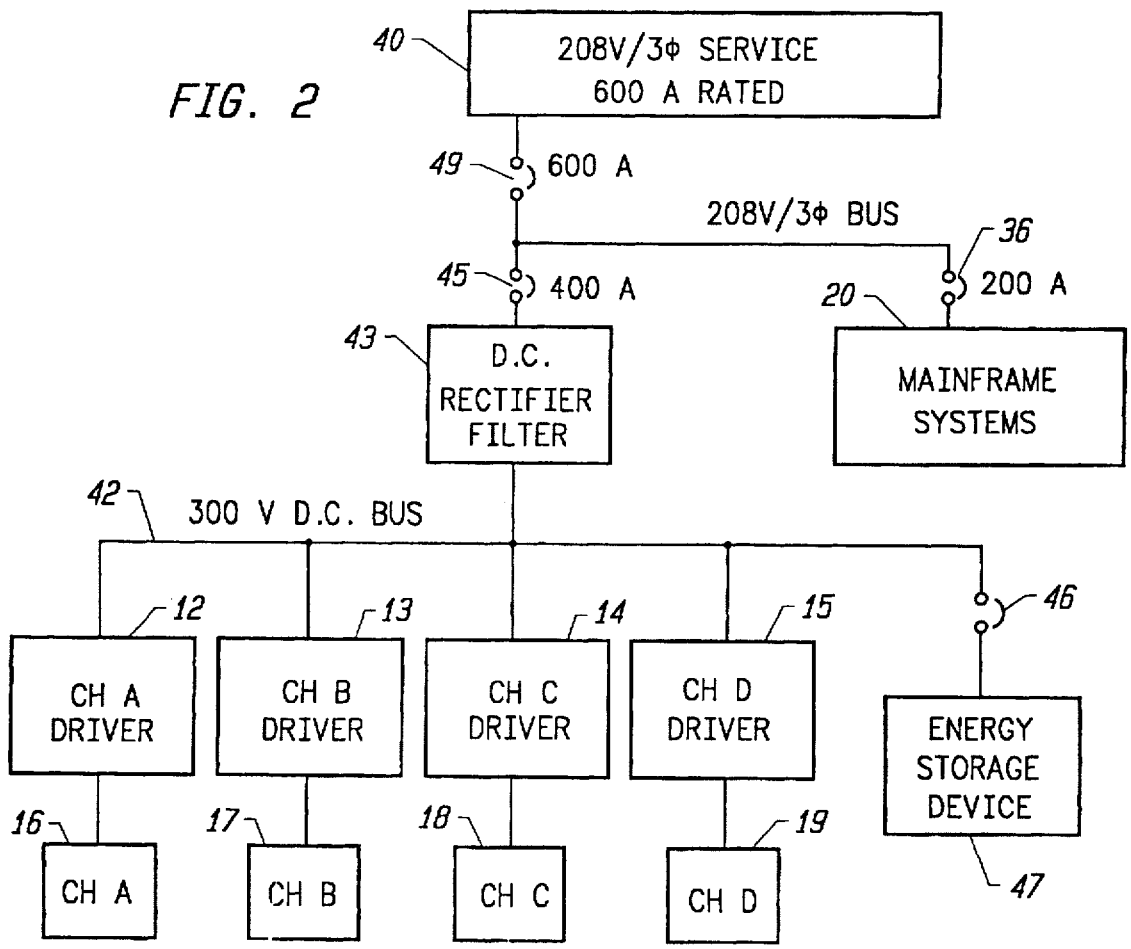
FIG. 2 is a block schematic diagram of a coordinated cluster-tool energy delivery system according to the invention.

FIG. 2 is a block schematic diagram of a coordinated cluster-tool energy delivery system according to the invention. The system requires a considerably smaller main service 41, i.e. 600 A, than the prior art service 10 shown in FIG. 1, i.e. 1200 A. The main service 41 is shown connected through a system circuit breaker 49, which is rated at 600 A, to an AC bus 44.

In the example shown in FIG. 2, the AC bus supplies electrical energy through a circuit breaker 30 to the main frame systems 20, as in the prior art. However, the system also supplies AC electrical energy through a circuit breaker 45 (rated at 400 A) to an AC-to-DC converter, such as the rectifier/filter 43, which converts the AC electrical energy into DC electrical energy. The DC rectifier/filter can be of any type, for example as is well known in the art, that meets the voltage, current, and filtering requirements of the application to which the invention is put. The filter smoothes the rectified DC power, as is known in the art. The filter may also be constructed to reduce or eliminate conducted or radiated electromagnetic interference (EMI).

Further, the rectifier/filter could be a switcher power supply. In such embodiment of the invention, any primary AC supply voltage could be matched to any DC bus voltage. This arrangement provides the additional benefits of power-factor correction, and the ability to handle brown-out conditions without impacting system performance. This embodiment of the invention also eliminates the need for stepup or step-down transformers in various applications.

The DC electrical energy is distributed via a DC bus 42 to a final power element, which in FIG. 2 includes the individual energy components 12–15 for each process chamber 16–19 that comprises the cluster tool. The final power element could also be such process machinery as, for example an RF generator, a magnetron power supply, a lamp driver, a microwave generator, or a motor driver. Each final power element can also include any necessary isolation and over-current protection. It should be appreciated that the voltages and currents described herein are provided only for purposes of example and that the invention is intended to be used to deliver electrical energy as required. Accordingly, the various elements of the system should be rated as appropriate for the application to which the invention is put.

The system disclosed herein is considered a significant advance in the art for at least the following reasons:

First, if the current devices that deliver energy to most process chambers are analyzed, for example magnetron drives for PVD, or RF generators for CVD or etch, it can be seen that there is a front-end AC voltage input that is converted to an intermediate DC voltage inside each one of these devices. The intermediate DC voltage must then be converted, for example to RF or magnetron drive, such that the voltage is in a form that is usable energy directly at the chamber.

Thus, the invention provides a system that takes advantage of the fact that, for at least some of the equipment that is used in an industrial process, it is often necessary to convert AC voltage to DC voltage. Instead of providing a separate DC source for each individual device, a significant advantage is realized by providing a single large DC voltage device that operates all devices which require DC voltage, thereby taking advantage of diversity.

As used herein, the term diversity relates to the fact that each piece of equipment in an industrial process does not typically run simultaneously with each other piece of equipment. For example, in a cluster-tool the equipment puts a wafer in Chamber A, then performs a process step in Chamber B and, by the very nature of the fact that it is necessary to move a workpiece through the cluster tool, there is a specific sequence in which Chambers A, B, C, and D are operated. Thus, it may be possible that Chambers A and C are run simultaneously, such that they both take DC voltage out of the DC rectifier. Then, while a robot is moving workpieces between the chambers, Chambers B and D run. The invention thus provides a significant reduction in the size of the DC component of the system, including a corresponding reduction in the size of the main AC breaker. In this example, the system requires components that are sized in half because high diversity is provided at the DC bus level.

Second, the invention includes an energy storage device 47 that is connected to the DC bus 42 via a circuit breaker 46. There is an additional advantage that can be realized using a DC voltage on an intermediate bus that allows a further reduction in the size of the main AC input. The DC storage device may be any device that is capable of storing DC energy, such as a battery, a capacitor, or a flywheel. This feature of the invention provides additional capacity saving.

For example, if analysis reveals that a particular piece of equipment only used 20 kilowatts on the average over a specific interval of time, but the peak usage was 100 kilowatts during the interval, it would still be necessary to size the electrical service for a 100 kilowatt load, even with the DC bus approach described herein. However, by incorporating an energy storage device that provides ride-through or load leveling, the main service only need be sized for a 20 kilowatt load, and the battery, capacitor, or other device that stored up energy could be used to meter energy out when needed, but at the average rate only.

The invention provides other advantages besides a high load diversity and load leveling. The invention also solves what has been stated as a problem by many equipment manufacturers, i.e. brown-outs or power fluctuations. Thus, the energy storage device stores energy at the DC bus level, such that operation of the equipment may be maintained during a momentary or prolonged drop-out. By adjusting the size of the energy storage device as appropriate it is possible to achieve a survival flicker of milliseconds, a brown-out of a few seconds, or an extended drop-out of minutes. It is only necessary to match the size of the energy storage device to the condition to be met.

However, unlike an uninterruptible power supply (UPS), where the electrical energy goes from an AC voltage to a DC voltage and back to an AC voltage, the invention eliminates two energy conversion stages, and is therefore more efficient and more reliable. Thus, there is less energy consumption and less heat generation.

The invention also allows the manufacture of less expensive equipment because it is now possible to make the equipment without an AC supply. For example, a typical device such as an RF generator or a magnetron power supply may have a foot print that is one foot by two foot square, where almost half of the space taken up by the device is devoted to converting AC voltage to DC voltage, and where the rest of the space is occupied by components that convert the DC voltage into the actual voltage or signal needed to operate the device. The invention reduces the bulkiness of such devices by eliminating the need for an AC-to-DC power supply.

Further, there is only one power system in the DC bus described herein. Accordingly, the mean time between failure is reduced because power supplies tend to be one of the most unreliable components of a device. The invention avoids the need to turn various power supplies on and off, which subjects them to such failure mechanisms as thermal shock. Thus, the DC section is more evenly loaded, the temperature stays constant, and some of the mechanical and junction failure mechanisms that normally dictate power supply life are avoided or reduced.

The system herein may also be provided as a building block type of product. For example, in an application that involves a machine that has two chambers, the system can include a smaller DC rectifier; if the application later involves a larger machine, the system can include a larger rectifier. Thus, in one embodiment of the invention the system is expandable. In such system, it is much easier to change capacity because such change is at the DC bus level rather than at the AC bus level.

Figure 3:
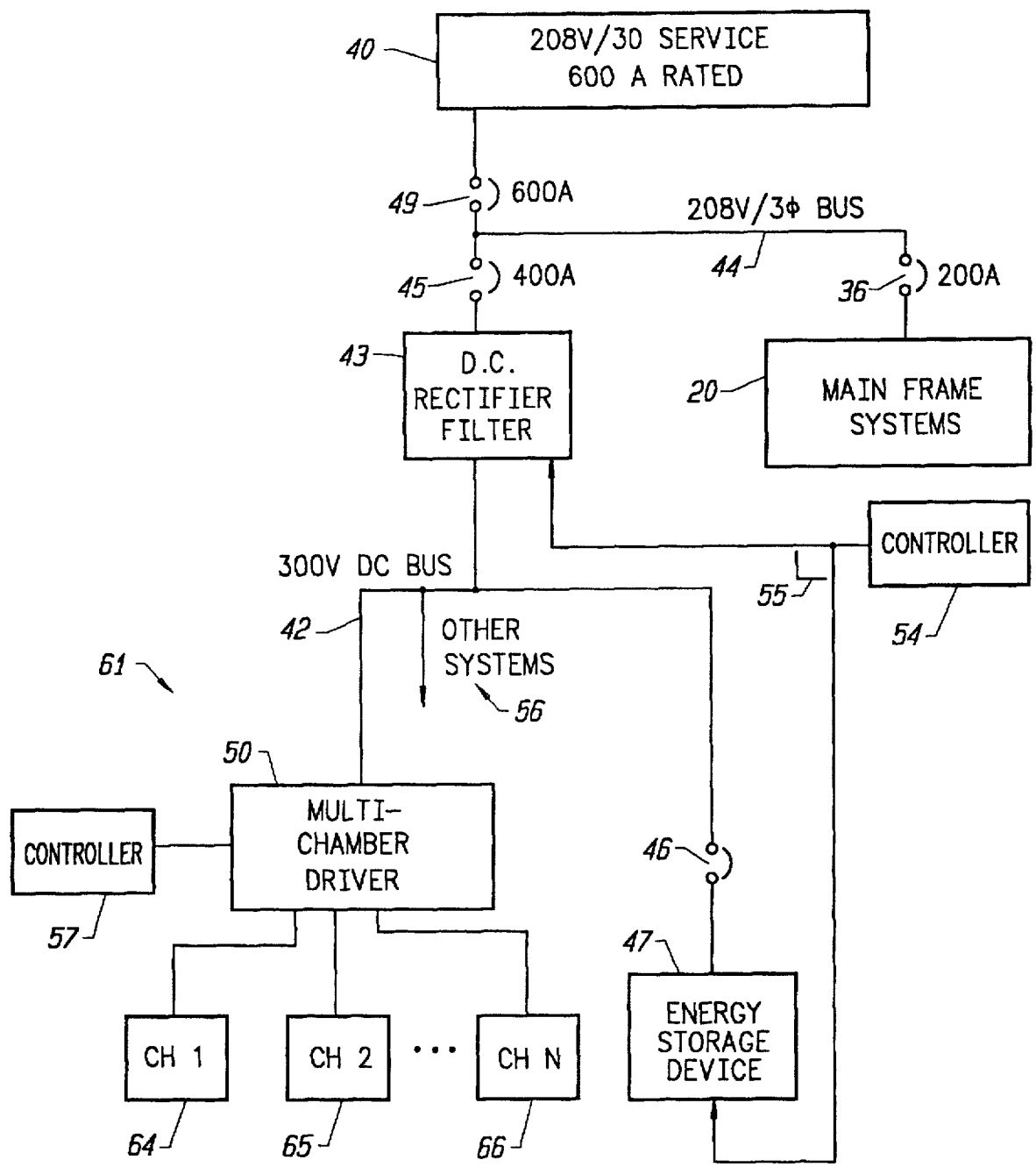
FIG. 3 is a block schematic diagram of a coordinated cluster-tool energy delivery system adapted for use with a multiple chamber semiconductor wafer processing system according to the invention.

FIG. 3 is a block schematic diagram of a coordinated cluster-tool energy delivery system adapted for use with a multiple chamber semiconductor wafer processing system 61 according to the invention. In this embodiment, a multiple chamber driver 50 is connected to the DC bus 42 and supplies electrical energy to multiple process chambers 63–66, which may be provided as part of a multiple chamber process system or which may be independent, but interoperative, process chambers. The DC bus 42 may also provide electrical energy to other systems 56.

A controller 57 may be included with the process system to coordinate operation of the multiple process chambers. Further, another controller 54 may be provided to coordinate operation of the DC rectifier/filter 43 and energy storage device 47, for example to operate the energy storage device when a power loss is sensed or to handle switching between the energy storage device and the DC filter/rectifier to avoid power surges. The construction of such controllers is straigthforward and considered to be within the ability of those skilled in the art.

Figure 4:
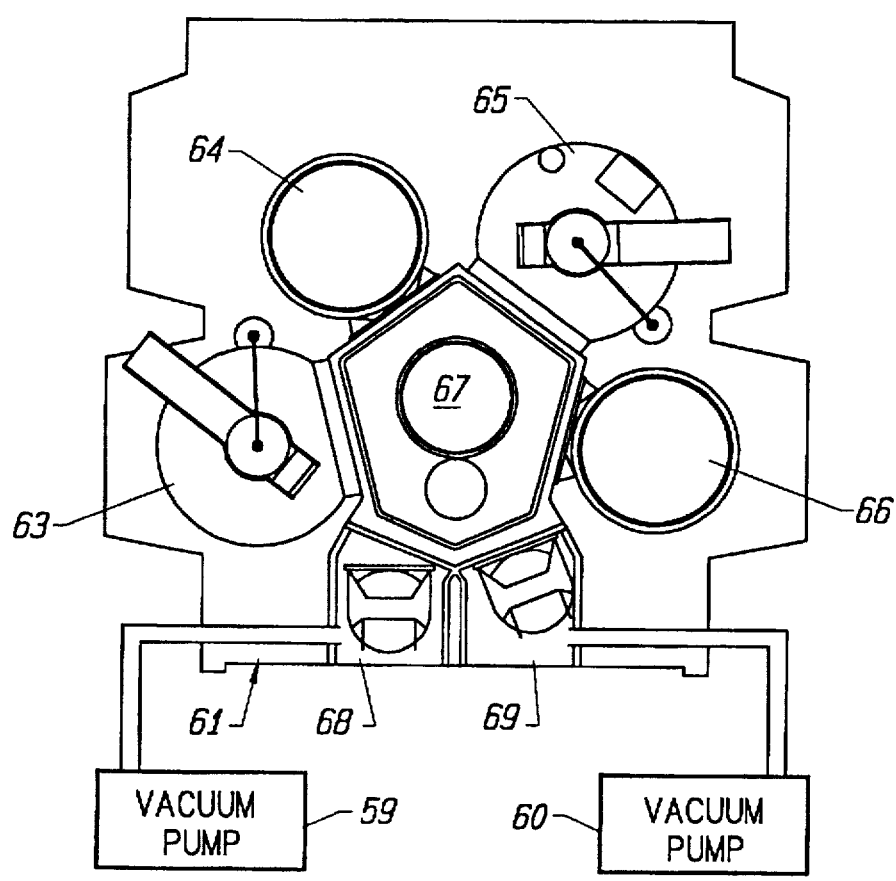
FIG. 4 shows a top view of a block diagram of a multiple chamber semiconductor wafer processing system which includes two cassette load locks, as shown in FIG. 3.

FIG. 4 shows a top view of a block diagram of a multiple chamber semiconductor wafer processing system 61 which includes two cassette load locks 68, 69, as shown in FIG. 3, and which may be used for etching, for example, or for other processes involved in the fabrication of semiconductor wafers in any of a first processing chamber 63, a second processing chamber 64, a third processing chamber 65, and a fourth processing chamber 66. Such processing system also includes robotic equipment 67 for moving wafers to or from one or more of the processing chambers; and vacuum pumps 59 and 60 for providing a vacuum in load locks 68 and 69, respectively. Such a system is disclosed in M. Toshima, P. Salzman, S. Murdoch, C. Wang, M. Stenholm, J. Howard, L. Hall, D. Cheng, Dual Cassette Load Lock, U.S. Pat. No. 5,186,594 (16 Feb. 1993). Such systems are available from Applied Materials, Inc. of Santa Clara, Calif. (the Centura® multi-chamber system).

It can be seen from the description above that there are several components within a multiple chamber processing system that require a supply of electrical energy at various times during a processing sequence, e.g. the load locks, robotic equipment, and vacuum pumps; and that any combination of the components may be used to allow processing to proceed in the several processing chambers associated with the processing system. The invention herein takes advantage of the fact that at any given time, portions of the processing system 61 are not operated, and thus the capacity of a power supply for the processing system may be reduced to less than the cumulative power required to operate all of the processing system components. Thus, a modified power distribution system could be installed within the processing system 61, such that the diversity of operation within the system is exploited by the provision of a smaller internal power supply in accordance with the invention herein. Alternatively, the internal power supply for the processing system 61 may be dispensed with entirely—with the power distribution system disclosed herein providing all power directly to the various components of the system 61, as shown in FIG. 3.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

We claim:

1. A high diversity electrical energy delivery system, comprising:

an AC-to-DC converter that converts AC electrical energy supplied by an AC source into DC electrical energy; and a DC bus for routing said DC electrical energy to a plurality of final power elements;

wherein at any given time, at least one of said plurality of final power elements is not energized with said DC electrical energy, and wherein said electrical energy delivery system has a capacity that is less than a cumulative peak power requirement of said plurality of final power elements.

2. The system of claim 1, said AC-to-DC converter further comprising:

a rectifier; and a filter.

3. The system of claim 1, wherein at least one of said final power elements includes an isolator.

4. The system of claim 1, wherein at least one of said final power elements includes an over-current protector.

5. The system of claim 1, wherein at least one of said final power elements includes both an isolator and an over-current protector.

6. The system of claim 1, wherein said system is provided in a modular format that allows ready alteration of system capacity in accordance with final power element power requirements.

7. The system of claim 1, further comprising:

an energy storage device that is connected to said DC bus and that is operable to supply electrical energy to said final power elements for any of load leveling, ride through, or brown out protection.

8. The system of claim 7, said energy storage device being operable to store electrical energy that is supplied to said DC bus by said converter.

9. The system of claim 1, wherein said final power elements comprise a multiple chamber processing system.

10. The system of claim 9, said multiple chamber processing system further comprising a controller.

11. The system of claim 7, wherein any of said AC-to-DC converter and said electrical storage device further comprise a controller.

12. A high diversity electrical energy delivery system, comprising:

an AC-to-DC converter for converting AC electrical energy supplied by an AC source into DC electrical energy;

a DC bus for routing said DC electrical energy to a plurality of final power elements; and an energy storage device that is connected to said DC bus and that is operable to supply electrical energy to said final power elements for any of load leveling, ride through, or brown out protection;

wherein at any given time, at least one of said plurality of final power elements is not energized with said DC electrical energy, and wherein said electrical energy delivery system has a capacity that is less than a cumulative peak power requirement of said plurality of final power elements.

13. The system of claim 12, wherein said AC-to-DC converter further comprises:

a rectifier; and a filter.

14. The system of claim 12, wherein said AC-to-DC converter further comprises:

a switcher power supply.

15. The system of claim 12, wherein at least one of said final power elements includes an isolator.

16. The system of claim 12, wherein at least one of said final power elements includes an over-current protector.

17. The system of claim 12, wherein at least one of said final power elements includes both an isolator and an over-current protector.

18. The system of claim 12, wherein said system is provided in a modular format that allows ready alteration of system capacity in accordance with final power element power requirements.

19. The system of claim 12, wherein said energy storage device stores electrical energy that is supplied to said DC bus by said AC-to-DC converter.

20. The system of claim 12, wherein said final power elements comprise a multiple chamber processing system.

21. The system of claim 20, said multiple chamber processing system further comprising a controller.

22. The system of claim 12, wherein any of said AC-to-DC converter and said electrical storage device further comprise a controller.

23. A high diversity electrical energy delivery method, comprising the steps of:
   converting AC electrical energy supplied by an AC source into DC electrical energy;
   routing said DC electrical energy to a plurality of final power elements over a DC bus; and
   supplying electrical energy to said final power elements for any of load leveling, ride through, or brown out protection with an energy storage device that is connected to said DC bus;
   wherein at any given time, at least one of said plurality of final power elements is not energized with said DC electrical energy, and wherein an electrical energy delivery system is provided having a capacity that is less than a cumulative peak power requirement of said plurality of final power elements.

24. The method of claim 23, wherein said routing step further comprises the step of providing isolation.

25. The method of claim 23, wherein said routing step further comprises the step of providing over current protection.

26. The method of claim 23, wherein said routing step further comprises the step of providing both isolation and over current protection.

27. The method of claim 23, further comprising the step of:
   providing a modular format that allows ready alteration of said electrical energy delivery system capacity in accordance with final power element power requirements.

28. The method of claim 23, further comprising the step of:
   storing electrical energy that is supplied to said DC bus with said energy storage device.

29. The method of claim 23, wherein said final power elements comprise a multiple chamber processing system.

30. The method of claim 29, further comprising the step of controlling operation of said multiple chamber processing system with a controller.

31. The method of claim 29, further comprising the step of controlling any of said AC-to-DC conversion step and said electrical storage step with a controller.

32. A high diversity electrical energy delivery method for a multiple chamber processing system, comprising the steps of:
   converting AC electrical energy supplied by an AC source into DC electrical energy;
   routing said DC electrical energy to a plurality of power elements within said processing system over a DC bus; and
   supplying electrical energy to said power elements for any of load leveling, ride through, or brown out protection with an energy storage device that is connected to said DC bus;
   wherein at any given time, at least one of said plurality of power elements is not energized with said DC electrical energy, and wherein an electrical energy delivery system is provided having a capacity that is less than a cumulative peak power requirement of said plurality of power elements.

33. A high diversity electrical energy delivery system for a multiple chamber processing system, comprising:
   an AC-to-DC converter for converting AC electrical energy supplied by an AC source into DC electrical energy;
   a DC bus for routing said DC electrical energy to a plurality of power elements within said processing system; and
   an energy storage device that is connected to said DC bus and that is operable to supply electrical energy to said power elements for any of load leveling, ride through, or brown out protection;
   wherein at any given time, at least one of said plurality of power elements is not energized with said DC electrical energy, and wherein said electrical energy delivery system has a capacity that is less than a cumulative peak power requirement of said plurality of power elements.

34. A system for processing semiconductor materials, comprising:
   at least one load lock;
   at least one processing chamber; and
   a high diversity electrical energy delivery system, wherein said high diversity electrical energy delivery system comprises:
      an AC-to-DC converter that converts AC electrical energy supplied by an AC source into DC electrical energy; and
      a DC bus for routing said DC electrical energy to a plurality of processing system power elements;
      wherein at any given time, at least one of said plurality of processing system power elements is not energized with said DC electrical energy, and wherein said electrical energy delivery system has a capacity that is less than a cumulative peak power requirement of said plurality of processing system power elements.

35. The system of claim 34, said AC-to-DC converter further comprising:
   a rectifier; and
   a filter.

36. The system of claim 34, wherein at least one of said processing system power elements includes an isolator.

37. The system of claim 34, wherein at least one of said processing system power elements includes an over-current protector.

38. The system of claim 34, wherein at least one of said processing system power elements includes both an isolator and an over-current protector.

39. The system of claim 34, wherein said processing system is provided in a modular format that allows ready alteration of system capacity in accordance with processing system power element power requirements.

40. The system of claim 34, further comprising:
   an energy storage device that is connected to said DC bus and that is operable to supply electrical energy to said processing system power elements for any of load leveling, ride through, or brown out protection.

41. The system of claim 40, said energy storage device being operable to store electrical energy that is supplied to said DC bus by said converter.

42. The system of claim 34, wherein said processing system power elements comprise a multiple chamber processing system.

43. The system of claim 42, said multiple chamber processing system further comprising a controller.

44. The system of claim 43, wherein any of said AC-to-DC converter and said electrical storage device further comprise a controller.

* * * * *